United States Patent
Yang

(10) Patent No.: US 10,298,073 B2
(45) Date of Patent: May 21, 2019

(54) METHOD AND APPARATUS FOR CONTROLLING WIRELESS INDUCTION POWER SUPPLY

(71) Applicant: SEMICONDUCTOR COMPONENTS INDUSTRIES, LLC, Phoenix, AZ (US)

(72) Inventor: Ta-Yung Yang, Milpitas, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 443 days.

(21) Appl. No.: 14/250,566

(22) Filed: Apr. 11, 2014

(65) Prior Publication Data

US 2014/0306548 A1   Oct. 16, 2014

Related U.S. Application Data

(60) Provisional application No. 61/811,215, filed on Apr. 12, 2013.

(51) Int. Cl.

| | |
|---|---|
| *H02J 50/60* | (2016.01) |
| *H02J 5/00* | (2016.01) |
| *H02J 50/10* | (2016.01) |
| *H02J 7/02* | (2016.01) |
| *G01V 3/12* | (2006.01) |
| *G01V 3/10* | (2006.01) |

(52) U.S. Cl.
CPC ............. *H02J 50/60* (2016.02); *H02J 5/005* (2013.01); *H02J 7/025* (2013.01); *H02J 50/10* (2016.02); *G01V 3/102* (2013.01); *G01V 3/12* (2013.01)

(58) Field of Classification Search
CPC ........................................ H02J 5/005
USPC ............................................. 307/104
See application file for complete search history.

(56) References Cited

U.S. PATENT DOCUMENTS

2007/0228833 A1* 10/2007 Stevens ............... H02J 5/005
                                                                    307/45
2011/0128015 A1*  6/2011 Dorairaj ............. H02J 7/025
                                                                    324/629

(Continued)

FOREIGN PATENT DOCUMENTS

CN    101159416 A    4/2008
CN    101388571 A    3/2009

(Continued)

*Primary Examiner* — Daniel Kessie
(74) *Attorney, Agent, or Firm* — Robert F. Hightower

(57) ABSTRACT

The present invention provides a method and an apparatus for controlling the wireless induction power supply. The apparatus comprises a transmitter control circuit and a receiver control circuit. The method comprises generating a plurality of switching signals for switching a transmitter winding and generating a power; detecting a level of a transmitter signal from the transmitter winding; and controlling a switch to deliver the power from a receiver winding to a load. The receiver winding is coupled to receive the power from the transmitter winding. The switching signals will be disabled if the level of the transmitter signal is not higher than a threshold over a first period or the level of the transmitter signal is higher than a high-threshold over a second period. Accordingly, the method and the apparatus according to the present invention have the foreign object detection (FOD) function for the safety.

20 Claims, 10 Drawing Sheets

(56) References Cited

U.S. PATENT DOCUMENTS

| | | | | |
|---|---|---|---|---|
| 2011/0196544 A1* | 8/2011 | Baarman | ................. | H02J 5/005 |
| | | | | 700/291 |
| 2012/0038317 A1* | 2/2012 | Miyamoto | ............. | H02J 7/025 |
| | | | | 320/108 |
| 2013/0187476 A1* | 7/2013 | Tsai | ....................... | H02J 17/00 |
| | | | | 307/104 |

FOREIGN PATENT DOCUMENTS

| | | | |
|---|---|---|---|
| CN | 102013736 A | 4/2011 | |
| JP | WO2012038808 * | 3/2013 | ............. H01J 17/00 |
| TW | 201308818 A | 2/2013 | |
| TW | 201315082 A | 4/2013 | |
| WO | 2012/160136 A2 | 11/2012 | |

* cited by examiner

METHOD AND APPARATUS FOR CONTROLLING WIRELESS INDUCTION POWER SUPPLY

REFERENCE TO RELATED APPLICATIONS

This Application is based on Provisional Application #61/811,215, filed 12 Apr. 2013, and currently pending.

FIELD OF THE INVENTION

The present invention relates to power supply, and more particularly, relates to method and apparatus for controlling the wireless induction power supply.

DESCRIPTION OF THE RELATED ART

The wireless induction power supply has been used to provide the power source for electronic products and charge the battery for the electronic products. The danger may be happened when the foreign object, such as metal object, is coupled to the wireless induction power supply by the magnetic field of the wireless induction power supply. Accordingly, the present invention provides a method and an apparatus for controlling the wireless induction power supply, which can detect the foreign object for the safety.

BRIEF SUMMARY OF THE INVENTION

It is an objective of the present invention to provide a method and an apparatus for controlling the wireless induction power supply. It includes the foreign object detection (FOD) function for the safety. The FOD function will prevent induction heating the foreign object.

It is an objective of the present invention to provide a method and an apparatus for controlling the wireless induction power supply. It can make the wireless induction power supply save the power when the load condition of the wireless induction power supply is the no load condition.

The method for controlling the wireless induction power supply according to the present invention comprises generating a plurality of switching signals for switching a transmitter winding and generating a power; detecting a level of a transmitter signal from the transmitter winding; and controlling a switch to deliver the power from a receiver winding to a load. The receiver winding is coupled to receive the power from the transmitter winding. The switching signals will be disabled if the level of the transmitter signal is not higher than a threshold over a first period or the level of the transmitter signal is higher than a high-threshold over a second period.

The apparatus for controlling the wireless induction power supply according to the present invention comprises a transmitter control circuit and a receiver control circuit. The transmitter control circuit generates a plurality of switching signals for switching a transmitter winding and generating a power. The transmitter control circuit further detects a level of a transmitter signal from the transmitter winding. The receiver control circuit controls a switch to deliver the power from a receiver winding to a load. The receiver winding is coupled to receive the power from the transmitter winding. The switching signals will be disabled if the level of the transmitter signal is not higher than a threshold over a first period or the level of the transmitter signal is higher than a high-threshold over a second period.

BRIEF DESCRIPTION OF THE DRAWINGS

The accompanying drawings are included to provide further understanding of the invention, and are incorporated into and constitute a part of this specification. The drawings illustrate embodiments of the invention and, together with the description, serve to explain the principles of the invention.

DETAILED DESCRIPTION OF THE INVENTION

Figure 1:
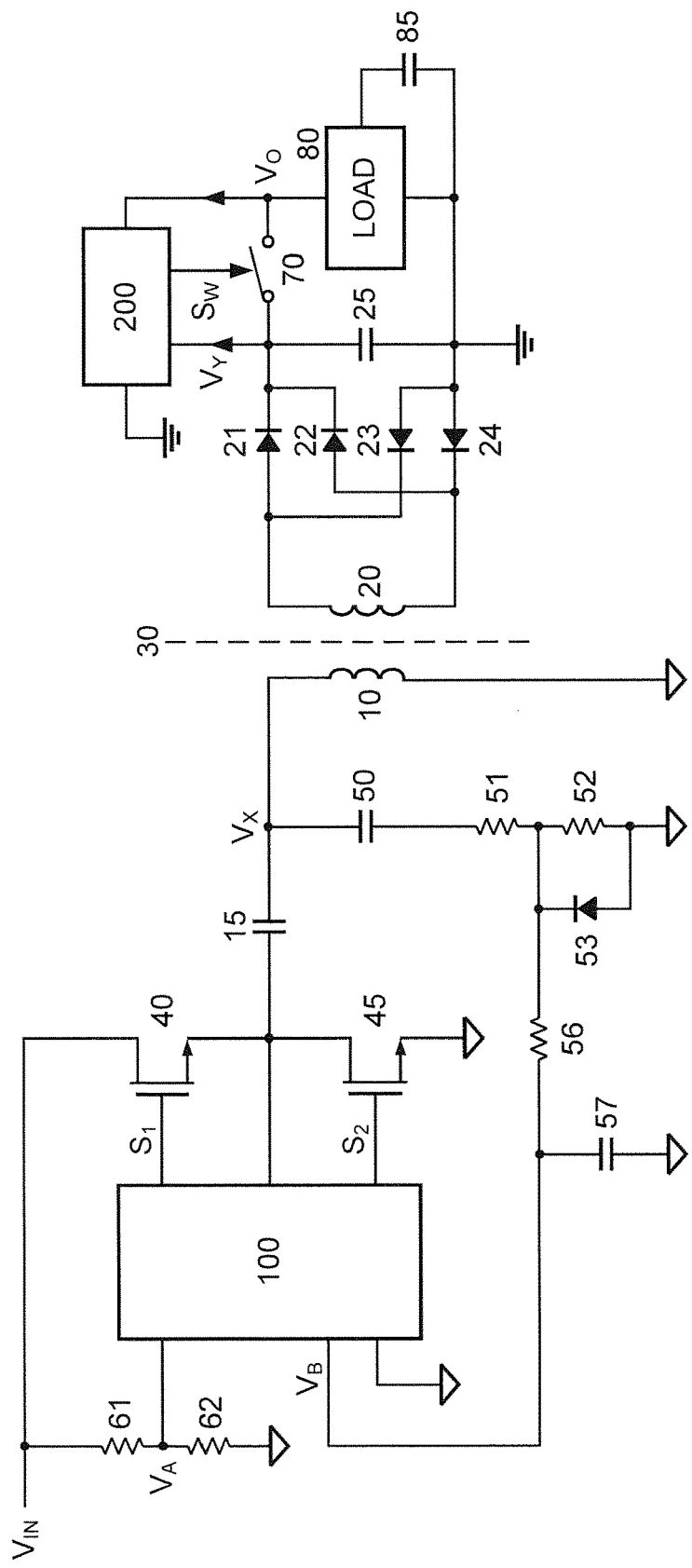
FIG. 1 shows a circuit diagram of an embodiment of the system for a wireless induction power supply according to the present invention.

FIG. 1 shows a circuit diagram of an embodiment of the system for a wireless induction power supply according to the present invention. A transmitter winding 10 is coupled between a second terminal of a capacitor 15 and a ground. A first transistor 40 is coupled between an input terminal of the wireless induction power supply and a first terminal of the capacitor 15. Therefore, an input voltage $V_{IN}$ is delivered to the transmitter winding 10 through the first transistor 40 and the capacitor 15. A second transistor 45 is coupled between the first terminal of the capacitor 15 and the ground. Therefore, the transistors 40 and 45 are coupled to the transmitter winding 10 through the capacitor 15 to switch the transmitter winding 10.

A transmitter control circuit 100 generates switching signals $S_1$ and $S_2$ to drive the transistors 40 and 45 for switching the transmitter winding 10 through the transistors 40, 45 and the capacitor 15. In other words, the transistors 40 and 45 develop a bridge topology for switching the transmitter winding 10. The transmitter control circuit 100 is further coupled to the first terminal of the capacitor 15. The switching signals $S_1$ and $S_2$ switch the transistors 40 and 45 to drive the transmitter winding 10 generate a transmitter signal $V_X$. The transmitter winding 10 will generate a magnetic field to generate the power in response to the input voltage $V_{IN}$. The power is a transmitter power. The transmitter winding 10 will transfer the power to a receiver winding 20 via a gap 30 (such as an air-gap). The receiver winding 20 will receive the power transferred from the transmitter winding 10 and generate a DC voltage $V_Y$ at a capacitor 25 through a plurality of rectifiers 21, 22, 23, and 24.

The first rectifier 21 is coupled between a first terminal of the receiver winding 20 and a first terminal of the capacitor 25. A second terminal of the capacitor 25 is coupled to another ground. The second rectifier 22 is coupled between a second terminal of the receiver winding 20 and the first terminal of the capacitor 25. The third rectifier 23 is coupled between the second terminal of the capacitor 25 and the first terminal of the receiver winding 20. The fourth rectifier 24 is coupled between the second terminal of the capacitor 25 and the second terminal of the receiver winding 20.

A switch 70 is connected between the first terminal of the capacitor 25 and a load 80 to deliver the power (DC voltage $V_Y$) from the capacitor 25 to the load 80. The load 80 includes a energy storage device such as battery and/or a capacitor 85 for the energy storage. A receiver control circuit 200 is coupled to detect the DC voltage $V_Y$ and a voltage $V_O$ of the load 80. The voltage $V_O$ is related to the DC voltage $V_Y$ and the load 80. The receiver control circuit 200 will generate a control signal $S_W$ to control the on/off of the switch 70.

The transmitter control circuit 100 is further coupled to detect the level of the input voltage $V_{IN}$ via a voltage divider developed by resistors 61 and 62. The voltage divider divides the input voltage $V_{IN}$ to generate a voltage $V_A$. The voltage $V_A$ is coupled to the transmitter control circuit 100 for transmitter control circuit 100 detecting the input voltage $V_{IN}$. In one embodiment of the present invention, the transmitter control circuit 100 generates the switching signals $S_1$ and $S_2$ in response to the level of the input voltage $V_{IN}$.

A capacitor 50, resistors 51, 52, and a diode 53 develop an attenuator coupled to the transmitter winding 10 for detecting the transmitter signal $V_X$. The capacitor 50 is coupled between the transmitter winding 10 and a first terminal of the resistor 51. The resistor 52 is coupled between a second terminal of the resistor 51 and the ground. An anode of the diode 53 is coupled to the ground and the resistor 52. A cathode of the diode 53 is coupled to a joint of the resistors 51 and 52. The attenuator is utilized to attenuate the transmitter signal $V_X$ for detecting the transmitter signal $V_X$ easily. A resistor 56 and a capacitor 57 form a filter for generating a signal $V_B$ according to an output of the attenuator. The signal $V_B$ represents the transmitter signal $V_X$. Accordingly, the attenuator and the filter are used for detecting the transmitter signal $V_X$ easily. In practical design, the transmitter signal $V_X$ can be detected by a variety of circuit.

A first terminal of the resistor 56 is coupled to the cathode of the diode 53 and the joint of the resistors 51 and 52. A first terminal of the capacitor 57 is coupled to a second terminal of the resistor 56 and the transmitter control circuit 100. A second terminal of the capacitor 57 is coupled to the ground.

The signal $V_B$ is coupled to the transmitter control circuit 100. The level of the signal $V_B$ is correlated to the level of the transmitter signal $V_X$. Therefore, the transmitter control circuit 100 can detect the level of the transmitter signal $V_X$ by detecting the level of the signal $V_B$. The level of the transmitter signal $V_X$ is related to the level of the input voltage $V_{IN}$ and the impedance (load) of the transmitter winding 10. The impedance of the transmitter winding 10 is determined by the object coupled to the transmitter winding 10 by the magnetic field of the transmitter winding 10. A lower impedance of the transmitter winding 10 will produce a lower level of the transmitter signal $V_X$.

The impedance of the transmitter winding 10 is related to the impedance of the receiver winding 20 according to the embodiment. The impedance across to the receiver winding 20 will be propositional to the impedance of the transmitter winding 10. For example, both the impedance across the receiver winding 20 and the transmitter winding 10 will become lower when the switch 70 is turned on and the load 80 is coupled to the receiver winding 20. The impedance of the transmitter winding 10 is also related to the impedance of the foreign object that is coupled to the transmitter winding 10 by the magnetic field of the transmitter winding 10. For example, a foreign object (material) with the characteristic of high eddy-current will cause low impedance to the transmitter winding 10.

Figure 2:
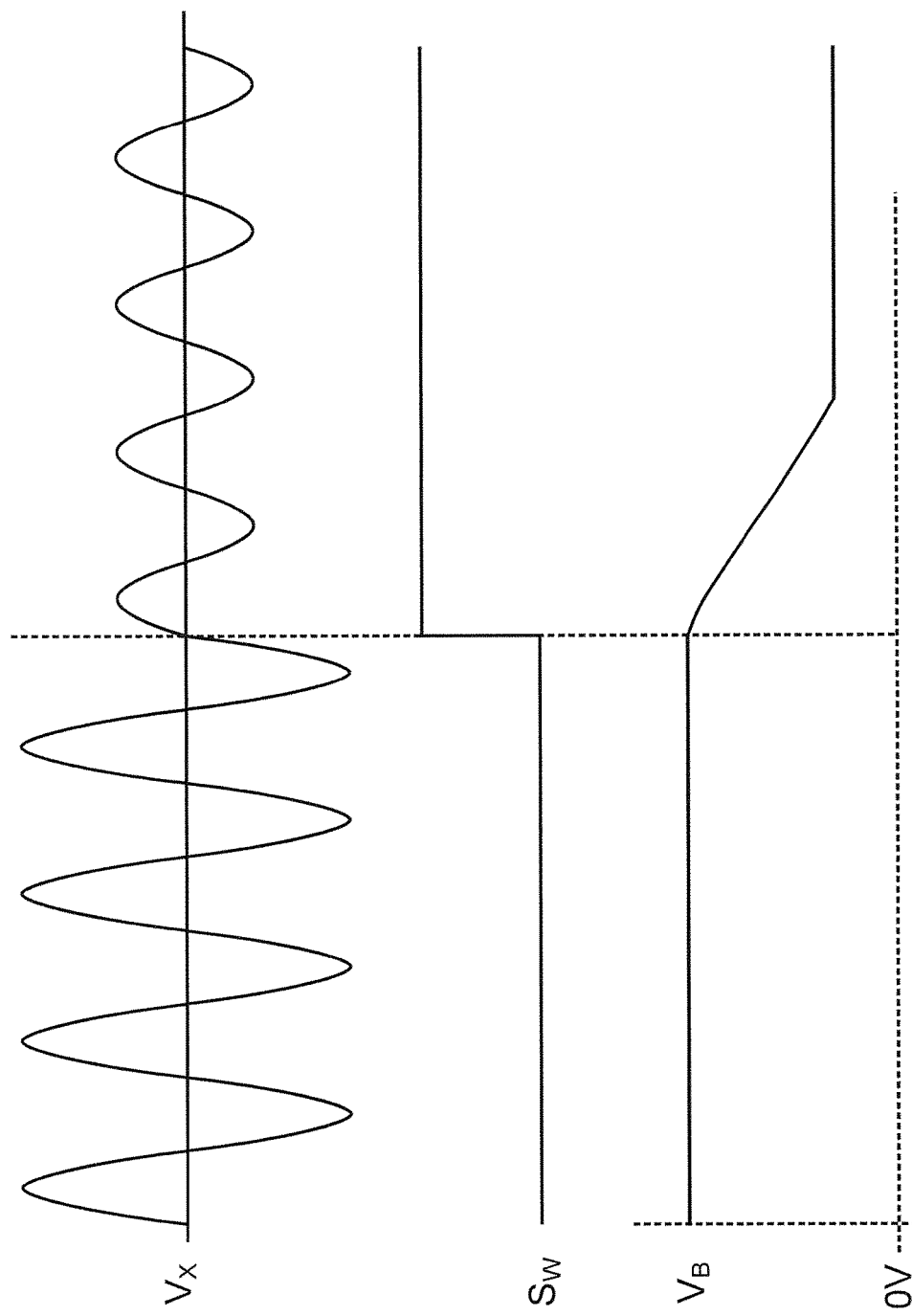
FIG. 2 shows the waveforms of the transmitter signal $V_X$, the control signal $S_W$, and the signal $V_B$ according to the present invention.
Figure 3:
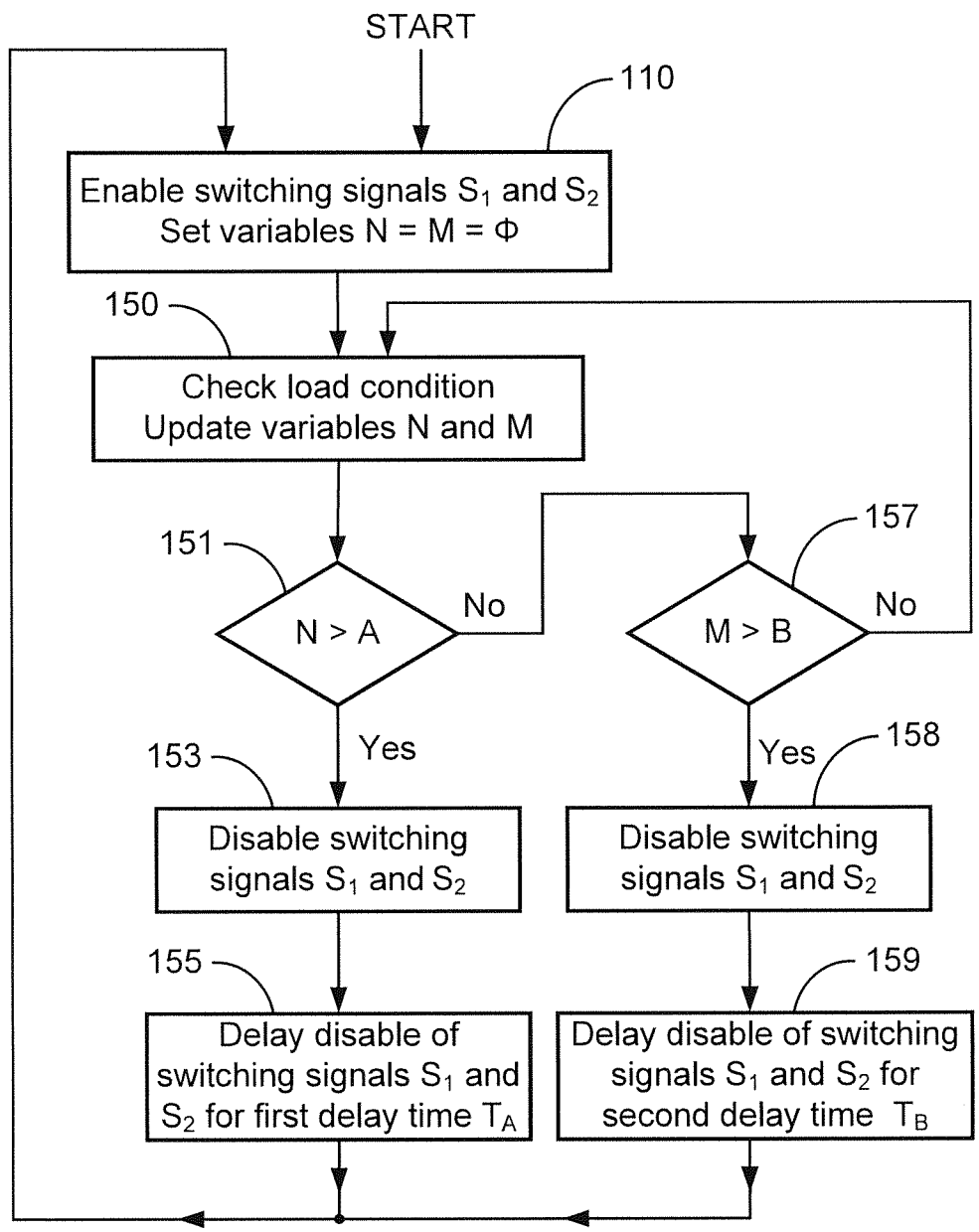
FIG. 3 is a control flow chart of an embodiment of the transmitter control circuit controlling the switching signals according to the present invention.

FIG. 2 shows the waveforms of the transmitter signal $V_X$, the control signal $S_W$, and the signal $V_B$ according to the present invention. The level of the signals $V_X$ and $V_B$ will be decreased in response to the turn on of the switch 70 (control signal $S_W$) shown in FIG. 1. FIG. 3 is a control flow chart of an embodiment of the transmitter control circuit 100 controlling the switching signals $S_1$ and $S_2$ according to the present invention. The transmitter control circuit 100 (as shown in FIG. 1) will start the operation shown in the block 110. According to the block 110, the transmitter control circuit 100 will enable the switching signals $S_1$ and $S_2$ (transfer the power from the transmitter winding 10 to the receiver winding 20, as shown in FIG. 1) and reset a variable N and a variable M to zero. The variable N represents a period of a heavy load condition. The variable M represents a period of a no load condition. Then, according to the block 150, the transmitter control circuit 100 will check the load condition and update the variables N and M according to the load condition.

According to the block 151, the transmitter control circuit 100 will check whether the value of the variable N is higher than a constant A or not. If the value of the variable N is higher than the constant A, then the switching signals $S_1$ and $S_2$ will be disabled (stop the power transfer of the transmitter winding 10) by the transmitter control circuit 100 according to the block 153. After that, the transmitter control circuit 100 will delay the disable (keep the disable) of the switching signals $S_1$ and $S_2$ for a first delay time $T_A$ (disable period) according to the block 155, and then the transmitter control circuit 100 repeats the operation of the block 110, which the control flow returns to the block 110. The first delay time $T_A$ shown in the block 155 is a constant.

According to the blocks 151 and 157, if the value of the variable N is equal to or lower than the constant A, then the transmitter control circuit 100 will check whether the value of the variable M is higher than a constant B or not. If the value of the variable M is higher than the constant B, then the switching signals $S_1$ and $S_2$ will be disabled by the transmitter control circuit 100 according to the block 158. After that, the transmitter control circuit 100 will delay the disable (keep the disable) of the switching signals $S_1$ and $S_2$ for a second delay time $T_B$ (disable period) according to the block 159, and then the transmitter control circuit 100 repeats the operation of the block 110, which the control flow returns to the block 110. The second delay time $T_B$ shown in the block 159 is a constant. According to the block 157, if the value of the variable M is equal to or lower than the constant B, then the transmitter control circuit 100 will repeats the operation of the block 150, which the control flow returns to the block 150.

Therefore, if the heavy load condition is continuing over a first period (N>A), then the switching signals $S_1$ and $S_2$ will be disabled for the first delay time $T_A$ (disable period) to limit the power delivered from the transmitter winding 10 to the foreign object coupled to the transmitter winding 10 by the magnetic field of the transmitter winding 10. The constant A represents the first period that is an over-load period. If the no load condition is continuing over a second period (M>B), then the switching signals $S_1$ and $S_2$ will be disabled for the second delay time $T_B$ (disable period) to save the power. The constant B represents the second period that is a no-load period. When the foreign object is detected or the no load condition is detected, the transmitter control circuit 100 disables the switching signals $S_1$ and $S_2$ and will start a status polling operation (shown in FIG. 10), which the transmitter control circuit 100 will periodically enable the switching signals $S_1$ and $S_2$, and then the level of the signal $V_B$ could increase. Therefore, the transmitter control circuit 100 detects the level of the signal $V_B$ for detecting the transmitter signal $V_X$ (as shown in FIG. 1).

Figure 4:
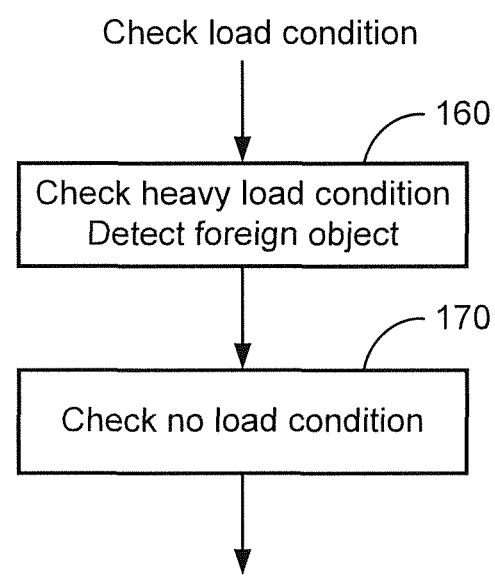
FIG. 4 is a flow chart of an embodiment of checking the load condition according to the present invention.

FIG. 4 is a flow chart of an embodiment of checking the load condition according to the present invention. According to the blocks 160 and 170, the operation of checking the load condition includes checking the heavy load condition and the no load condition. The transmitter control circuit 100 (as shown in FIG. 1) further detects the foreign object according to the block 160, which the transmitter control circuit 100 does the foreign object detection (FOD).

Figure 5:
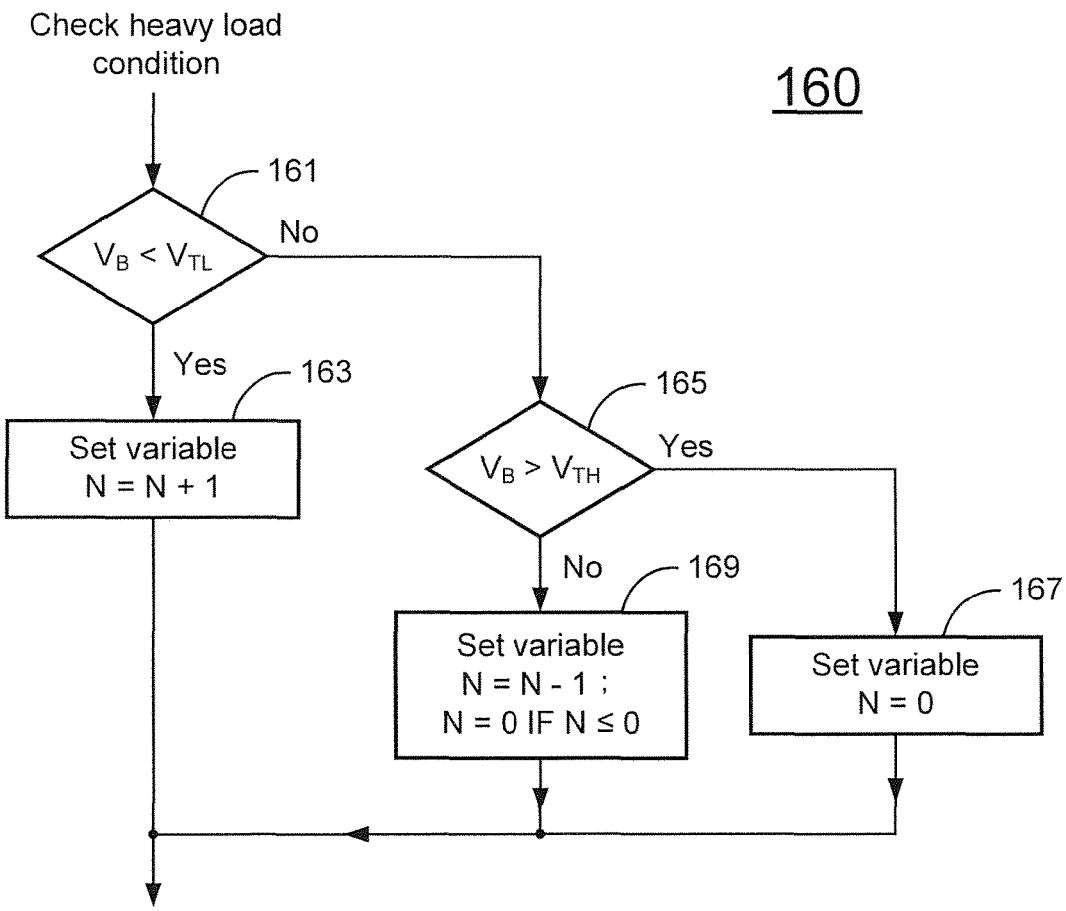
FIG. 5 is a flow chart of an embodiment of checking the heavy load condition according to the present invention.

FIG. 5 is a flow chart of an embodiment of checking the heavy load condition according to the present invention. According to the block 161, the transmitter control circuit 100 (as shown in FIG. 1) will check whether the level of the signal $V_B$ is lower than a threshold $V_{TL}$ or not. That is, the transmitter control circuit 100 checks whether the level of the transmitter signal $V_X$ (as shown in FIG. 1) is lower than a low-threshold or not. The low-threshold is correlated to the threshold $V_{TL}$. If the level of the signal $V_B$ is lower than the threshold $V_{TL}$, that the level of the transmitter signal $V_X$ is lower than the low-threshold, the load condition is the heavy load condition. According to the blocks 161 and 163, if the level of the signal $V_B$ is lower than the threshold $V_{TL}$, then the transmitter control circuit 100 sets variable N=N+1.

According to the blocks 161 and 165, if the level of the signal $V_B$ is equal to or higher than the threshold $V_{TL}$, then the transmitter control circuit 100 will further verify whether the level of the signal $V_B$ is higher than a threshold $V_{TH}$ or not. That is, the transmitter control circuit 100 will check whether the level of the transmitter signal $V_X$ is higher than a high-threshold or not. The high-threshold is correlated to the threshold $V_{TH}$. If the level of the signal $V_B$ is higher than the threshold $V_{TH}$, then the transmitter control circuit 100 sets variable N=0 according to the block 167. If the level of the signal $V_B$ is equal to or lower than the threshold $V_{TH}$, then the transmitter control circuit 100 will set variable N=N-1 or set variable N=0 if variable N is equal to or less than 0 according to the block 169.

Figure 6:
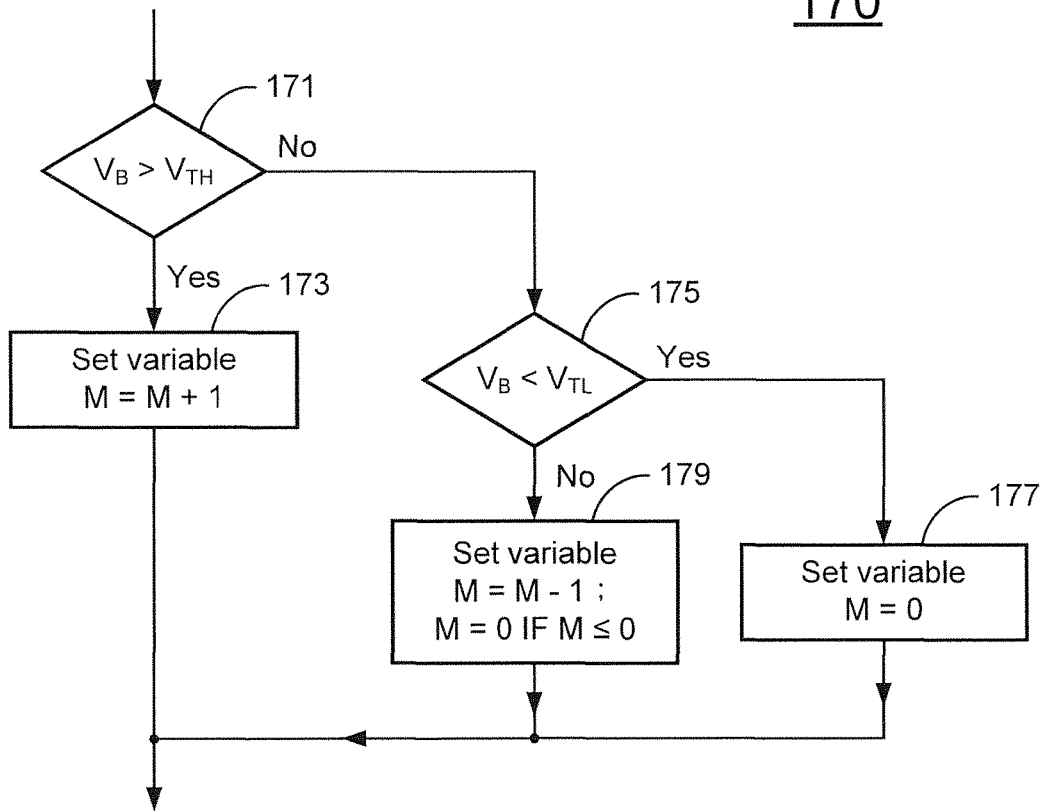
FIG. 6 is a flow chart of an embodiment of checking the no load condition according to the present invention.

FIG. 6 is a flow chart of an embodiment of checking no load condition according to the present invention. According to the block 171, the transmitter control circuit 100 (as shown in FIG. 1) will check whether the level of the signal $V_B$ is higher than the threshold $V_{TH}$ or not. If the level of the signal $V_B$ is higher than the threshold $V_{TH}$, that the level of the transmitter signal $V_X$ is higher than the high-threshold, the load condition is the no load condition. According to the blocks 171 and 173, if the level of the signal $V_B$ is higher than the threshold $V_{TH}$, then the transmitter control circuit 100 sets variable M=M+1.

According to the blocks 171 and 175, if the level of the signal $V_B$ is equal to or lower than the threshold $V_{TH}$, then the transmitter control circuit 100 will further verify whether the level of the signal $V_B$ is lower than the threshold $V_{TL}$ or not. That is, the transmitter control circuit 100 will check whether the level of the transmitter signal $V_X$ is lower than the low-threshold or not. If the level of the signal $V_B$ is lower than the threshold $V_{TL}$, then the transmitter control circuit 100 will set variable M=0 according to the block 177. If the level of the signal $V_B$ is equal to or higher than the threshold $V_{TC}$, then the transmitter control circuit 100 will set variable M=M-1 or set variable M=0 if M is equal to or less than 0 according to the block 179.

Figure 7:
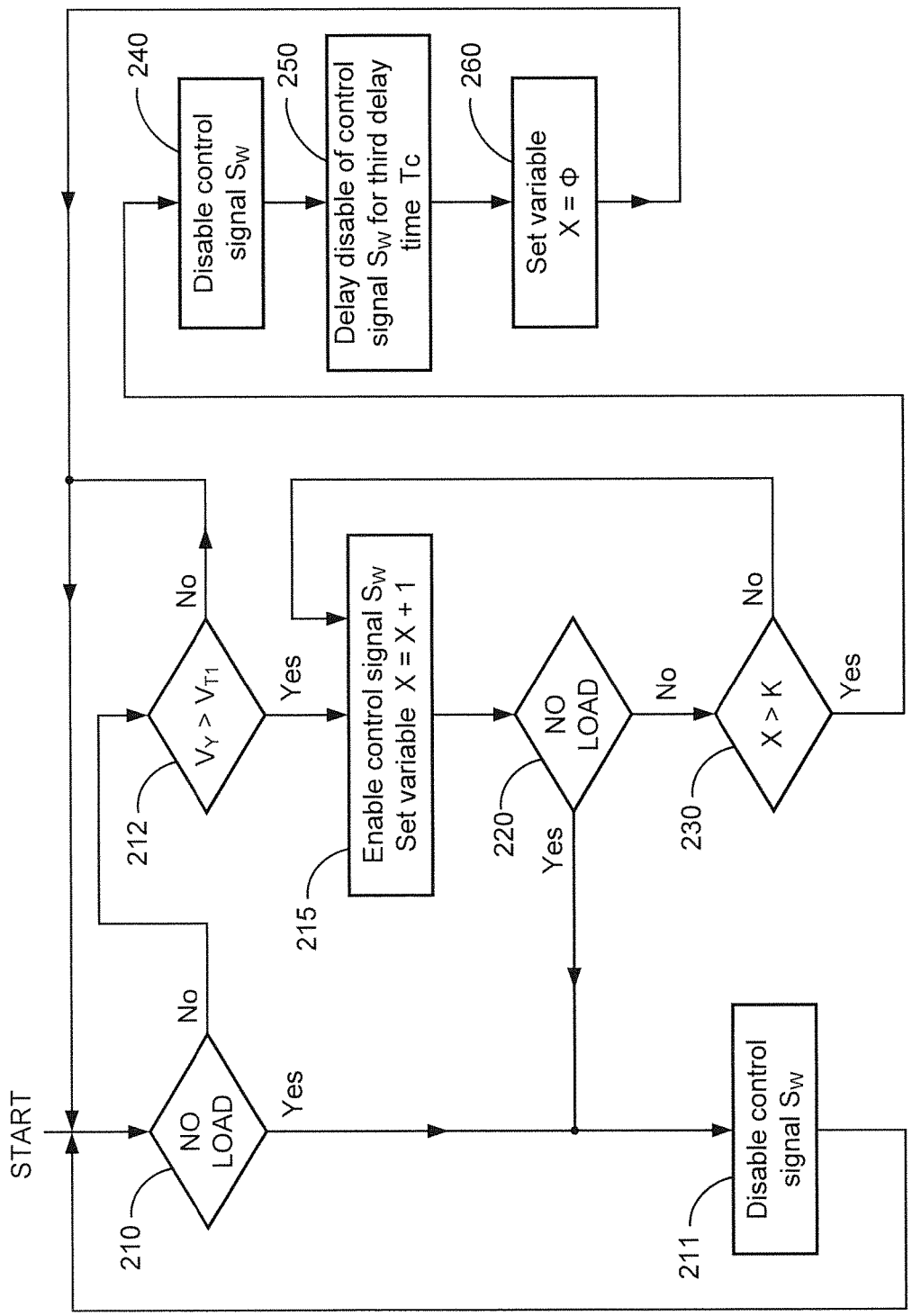
FIG. 7 is a control flow chart of an embodiment of the receiver control circuit controlling the switch according to the present invention.

FIG. 7 is a control flow chart of an embodiment of the receiver control circuit controlling the switch (control signal $S_W$) according to the present invention. The receiver control circuit 200 (as shown in FIG. 1) will check the load condition of the load 80 (as shown in FIG. 1) according to the block 210. That is, the receiver control circuit 200 will check whether the load condition of the load 80 is the no load condition or not. According to the blocks 210 and 211, if the load condition of the load 80 is the no load condition and/or the level of the voltage $V_O$ (as shown in FIG. 1) is high, then the receiver control circuit 200 will disable the control signal $S_W$ (as shown in FIG. 1), turn off the switch 70 (as shown in FIG. 1) and repeat the operation of the block 210, that the control flow returns to the block 210. Otherwise, the receiver control circuit 200 will check whether the level of the DC voltage $V_Y$ is higher than a threshold $V_{T1}$ or not according to the block 212. If the level of the DC voltage $V_Y$ is equal to or lower than the threshold $V_{T1}$, then the receiver control circuit 200 will repeats the operation of the block 210.

According to the blocks 212 and 215, if the level of the DC voltage $V_Y$ is higher than the threshold $V_{T1}$, then the receiver control circuit 200 will enable the control signal $S_W$ to turn on the switch 70 and set X=X+1 (wherein X is a variable). After that, according to the block 220, the receiver control circuit 200 will further check whether the load condition of the load 80 is the no load condition or not. If the load condition of the load 80 is the no load condition and/or the level of the voltage $V_O$ is high, then the receiver control circuit 200 will disable the control signal $S_W$ to turn off the switch 70 according to the block 211, and then repeat the operation of the block 210. According to the blocks 220 and 230, if the load condition of the load 80 is not the no load condition and/or the level of the voltage $V_O$ is low, then the receiver control circuit 200 will check whether the value of the variable X is higher than a constant K or not. If the value of the variable X is equal to or lower than the constant K, then the receiver control circuit 200 will repeat the operation of the block 215. Otherwise, the receiver control circuit 200 will disable the control signal $S_W$ to turn off the switch 70 according to the block 240, and delay the disable (keep the disable) of the control signal $S_W$ for a third delay time $T_C$ (disable period) according to the block 250. The third delay time $T_C$ is a constant. After that, the receiver control circuit 200 will set variable X=0 according to the block 260, and then repeat the operation of the block 210, that the control flow returns to the block 210.

Therefore, the receiver control circuit 200 will check whether the load condition of the load 80 is the no load condition or not. The receiver control circuit 200 will turn off the switch 70 if the load condition of the load 80 is the no load condition. If the load condition of the load 80 is not the no load condition, then the receiver control circuit 200 will check whether the induction power has been inputted or not (by checking the level of the DC voltage $V_Y$). If the load condition of the load 80 is not the no load condition and the induction power has been inputted, then the control signal $S_W$ will be enabled and the switch 70 will be turned on to receive the induction power. Once the switch 70 is turned on, the receiver control circuit 200 will periodically turn off the switch 70, which will build the communication (synchronization) with the transmitter control circuit 100. The on time of the switch 70 is determined by the variable X and constant K (X>K), and the off time of the switch 70 is decided by the third delay time $T_C$.

Figure 8:
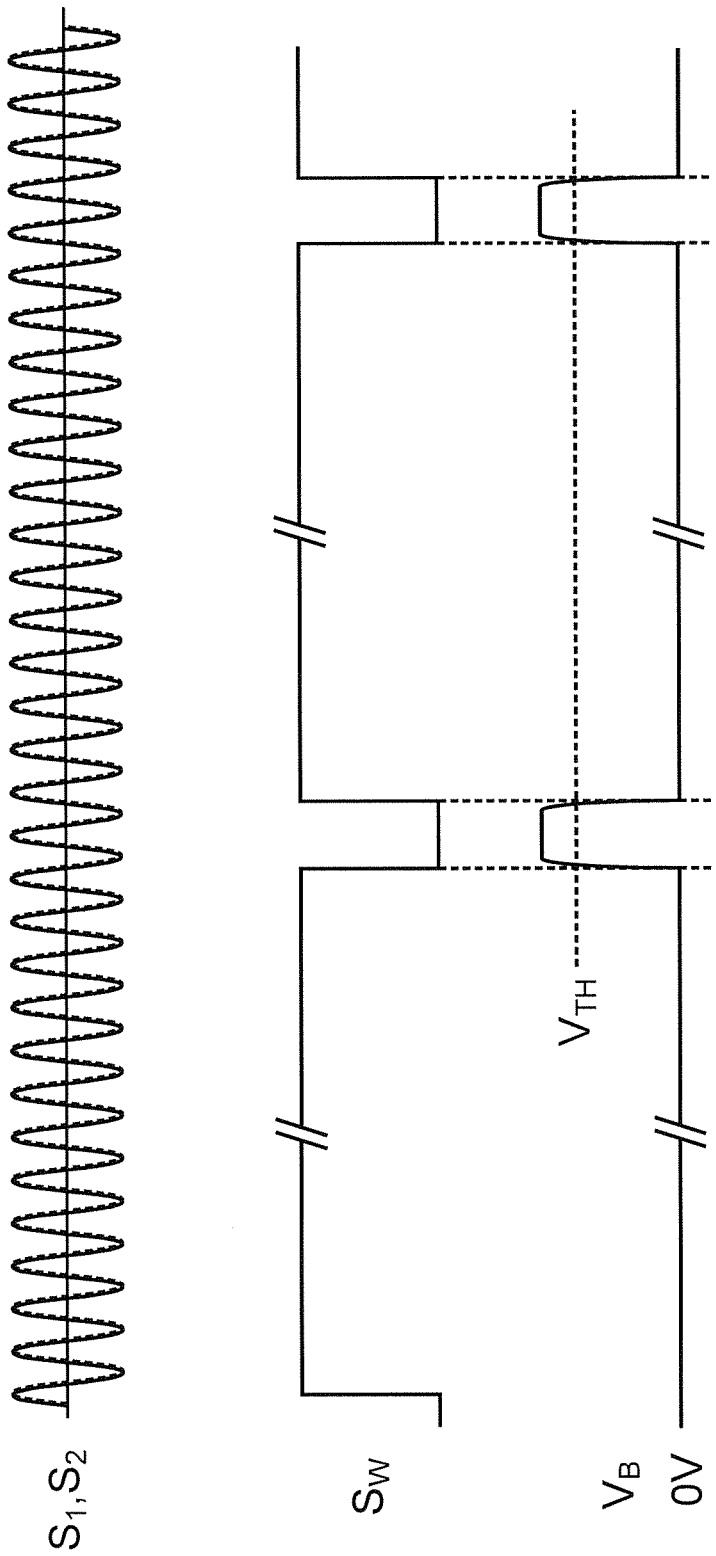
FIG. 8 shows the waveforms of the switching signals $S_1$, $S_2$, the control signal $S_W$, and the signal $V_B$ according to the present invention.

FIG. 8 shows the waveforms of the switching signals $S_1$, $S_2$, the control signal $S_W$, and the signal $V_B$ according to the present invention. The control signal $S_W$ will be periodically disabled to periodically turn off the switch 70 shown in FIG. 1. The level of the signal $V_B$ will be increased in response to the turn off of the switch 70 (the disable of the control signal $S_W$). Therefore, the transmitter control circuit 100 (as shown in FIG. 1) can detect the synchronization by detecting the signal $V_B$.

Figure 9:
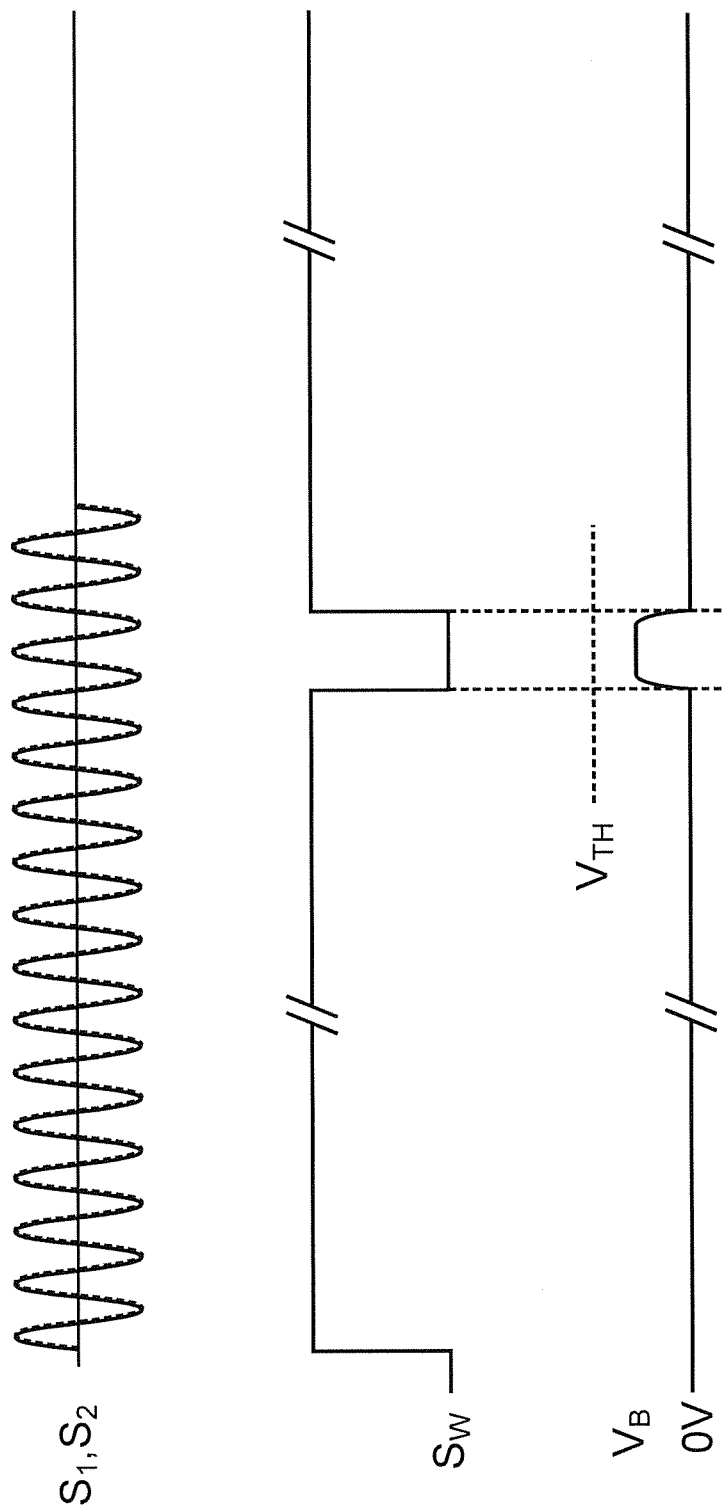
FIG. 9 shows the waveforms of the switching signals $S_1$, $S_2$, the control signal $S_W$, and the signal $V_B$ during the foreign object is detected according to the present invention.

FIG. 9 shows the waveforms of the switching signals $S_1$, $S_2$, the control signal $S_W$, and the signal $V_B$ during the foreign object is detected according to the present invention. Because the foreign object will consume the power generated from the transmitter winding 10 (as shown in FIG. 1), the level of the signal $V_B$ can not be higher than the threshold $V_{TH}$, even the switch 70 (the control signal $S_W$) shown in FIG. 1 is turned off. Thus, the switching signals $S_1$ and $S_2$ will be disabled to limit the power deliver to the foreign object for the safety.

Figure 10:
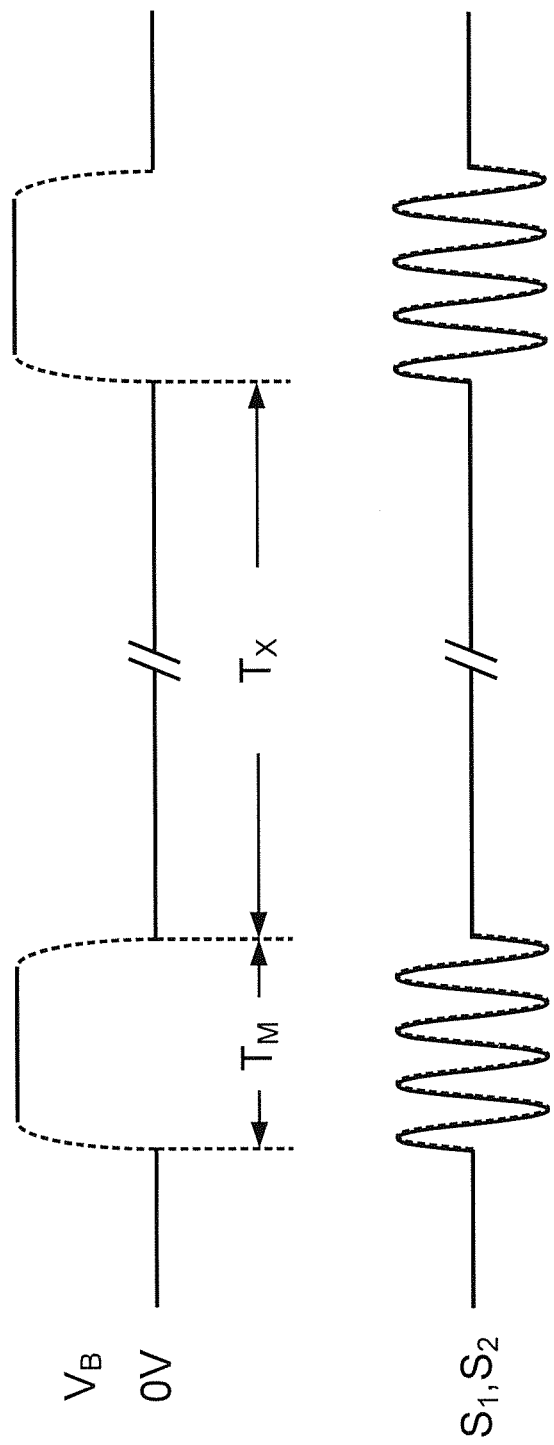
FIG. 10 shows the waveforms of the switching signals $S_1$, $S_2$, and the signal $V_B$ during the no load condition or the foreign object being detected according to the present invention.

FIG. 10 shows the waveforms of the switching signals $S_1$, $S_2$, and the signal $V_B$ during the no load condition or the foreign object being detected according to the present invention, in which the transmitter control circuit 100 (as shown in FIG. 1) will do the status polling during the no load condition or if the foreign object is detected. The transmitter control circuit 100 will periodically enable the switching signals $S_1$ and $S_2$, and then the level of the signal $V_B$ could increase. Therefore, the transmitter control circuit 100 can detect the level of the signal $V_B$ for detecting the transmitter signal $V_X$ (as shown in FIG. 1). The $T_M$ represents the enable time of the switching signals $S_1$ and $S_2$. The $T_X$ represents the disable time of the switching signals $S_1$ and $S_2$.

Although the present invention and the advantages thereof have been described in detail, it should be understood that various changes, substitutions, and alternations can be made therein without departing from the spirit and scope of the invention as defined by the appended claims. That is, the discussion included in this invention is intended to serve as a basic description. It should be understood that the specific discussion may not explicitly describe all embodiments possible; many alternatives are implicit. The generic nature of the invention may not fully explained and may not explicitly show that how each feature or element can actually be representative of a broader function or of a great variety of alternative or equivalent elements. Again, these are implicitly included in this disclosure. Neither the description nor the terminology is intended to limit the scope of the claims.

What is claimed is:

1. A method for controlling a wireless induction power supply, comprising:
    generating a plurality of switching signals for switching a transmitter winding and generating a power;
    detecting a level of a transmitter signal from the transmitter winding while the switching signals are enabled and while the power is not delivered to a load for detecting a foreign object, the switching signals remain enabled if the level of the transmitter signal is higher than a threshold, the switching signals are disabled if the level of the transmitter signal is not higher than the threshold for a first time period, and the status of the load is detected as no-load and the switching signals are disabled if the level of the transmitter signal is higher than a high-threshold for a second time period, wherein the high-threshold is greater than the threshold; and
    controlling a switch to deliver the power from a receiver winding to the load wherein the receiver winding is coupled to receive the power from the transmitter winding.

2. The method as claimed in claim 1, wherein if the switching signals are disabled in response to the level of the transmitter signal is not higher than the threshold for the first period, periodically re-enabling the switching signals to detect the level of the transmitter signal.

3. The method as claimed in claim 1, wherein the switching signals are coupled to drive a plurality of transistors coupled to the transmitter winding; the transistors develop a bridge topology to switch the transmitter winding.

4. The method as claimed in claim 1, wherein if the switching signals are disabled in response to the level of the transmitter signal is higher than the high-threshold for the second period, re-enabling the switching signals periodically to detect the level of the transmitter signal.

5. The method as claimed in claim 1, further comprising detecting a level of an input voltage of the wireless induction power supply.

6. The method as claimed in claim 1, including periodically turning-off the switch to decouple the load from receiving the power wherein the switch is coupled in series between the receiver winding and the load.

7. The method as claimed in claim 6, including turning-off the switch when the load condition is a no load condition.

8. The method as claimed in claim 1, wherein the level of the transmitter signal is related to a level of an input voltage of the wireless induction power supply and an impedance of the transmitter winding, the impedance of the transmitter winding becomes lower and the level of the transmitter signal is decreased when the foreign object is coupled to the transmitter winding by a magnetic field of the transmitter winding.

9. The method of claim 1 including configuring the control circuit to control the transmitter winding without receiving a signal from another controller coupled to control the receiver winding.

10. A method for controlling a wireless induction power supply, comprising:
    generating a plurality of switching signals for switching a transmitter winding and generating a power;
    detecting a level of a transmitter signal from the transmitter winding while the switching signals remain enabled and while not delivering the power to a load for detecting a foreign object, wherein a status of the load is detected as no foreign object is detected and the switching signals continue to be enabled if the level of the transmitter signal is higher than a low-threshold, and the status of the load is detected as no-load and the switching signals are disabled if the level of the transmitter signal is higher than a high-threshold for a first time period; and
    controlling a switch to deliver the power from a receiver winding to the load wherein the receiver winding is coupled to receive the power from the transmitter winding.

11. The method as claimed in claim 10, wherein if the switching signals are disabled in response to the level of the transmitter signal is higher than the high-threshold for the first time period, re-enabling the switching signals periodically to detect the level of the transmitter signal.

12. The method as claimed in claim 10, wherein the switching signals are coupled to drive a plurality of transistors coupled to the transmitter winding; the plurality of transistors develop a bridge topology to switch the transmitter winding.

13. The method as claimed in claim 10, wherein the switching signals are disabled if the level of the transmitter signal is not higher than the low-threshold for a second time period.

14. The method as claimed in claim 13, wherein if the switching signals are disabled in response to the level of the transmitter signal is not higher than the low-threshold for the second time period, re-enabling the switching signals periodically to detect the level of the transmitter signal.

15. The method as claimed in claim 10, further comprising detecting a level of an input voltage of the wireless induction power supply.

16. The method as claimed in claim 10, wherein the switch is periodically turned off to decouple the load from receiving the power.

17. The method as claimed in claim 10, wherein the level of the transmitter signal is related to a level of an input voltage of the wireless induction power supply and an impedance of the transmitter winding, the impedance of the transmitter winding becomes lower and the level of the transmitter signal is decreased when the foreign object is coupled to the transmitter winding by a magnetic field of the transmitter winding.

18. The method as claimed in claim 10, wherein the switch is turned off when the condition of the load is a no load condition.

19. An apparatus for controlling a wireless induction power supply, comprising:
 a transmitter control circuit generating a plurality of switching signals for switching a transmitter winding and generating a power, and detecting a level of a transmitter signal from the transmitter winding while the switching signals remain enabled and while not delivering the power to a load for detecting a foreign object, wherein the foreign object is detected and the switching signals are disabled if the level of the transmitter signal is not higher than a threshold for a first time period, and the status of the load is detected as no-load and the switching signals are disabled if the level of the transmitter signal is higher than a high-threshold for a second time period; and
 a receiver control circuit controlling a switch to deliver the power from a receiver winding from to the load wherein the receiver winding is coupled to receive the power from the transmitter winding.

20. The apparatus of claim 19 wherein the transmitter control circuit is configured to disable the switching signals in response to the level of the transmitter signal is less than a low threshold indicating a heavy load condition wherein the low threshold is less than the first threshold and less than the high-threshold.

\* \* \* \* \*